(12) United States Patent
Saul

(10) Patent No.: US 8,241,500 B2
(45) Date of Patent: Aug. 14, 2012

(54) BIOAUGMENTATION TO REMEDIATE DIOXANE IN GROUNDWATER

(75) Inventor: Michael T. Saul, Cincinnati, OH (US)

(73) Assignee: CI Solutions, LLC, Cincinnati, OH (US)

( * ) Notice: Subject to any disclaimer, the term of this patent is extended or adjusted under 35 U.S.C. 154(b) by 249 days.

(21) Appl. No.: 12/623,672

(22) Filed: Nov. 23, 2009

(65) Prior Publication Data

US 2010/0140168 A1 Jun. 10, 2010

Related U.S. Application Data

(60) Provisional application No. 61/119,775, filed on Dec. 4, 2008.

(51) Int. Cl.
*C02F 3/00* (2006.01)
(52) U.S. Cl. ........................................ 210/611
(58) Field of Classification Search .................. 210/611
See application file for complete search history.

(56) References Cited

U.S. PATENT DOCUMENTS

| | | | |
|---|---|---|---|
| 6,762,047 B2 * | 7/2004 | Vandenbergh | 435/252.34 |
| 7,405,067 B2 * | 7/2008 | Huang et al. | 435/253.3 |
| 2002/0015991 A1 * | 2/2002 | Brennan et al. | 435/262.5 |
| 2006/0286658 A1 * | 12/2006 | Felder et al. | 435/253.3 |

OTHER PUBLICATIONS

Fritsche, W. and Hofrichter, M. (2005) Aerobic Degradation of Recalcitrant Organic Compounds by Microorganisms, in Environmental Biotechnology: Concepts and Applications (eds H.-J. Jördening and J. Winter), Wiley-VCH Verlag GmbH & Co. KGaA, Weinheim, FRG. doi: 10.1002/3527604286.ch7 (Published Online: Jul. 26, 2005, Published Print: Nov. 24, 2004).*

* cited by examiner

*Primary Examiner* — Chester Barry
(74) *Attorney, Agent, or Firm* — Thompson Hine LLP

(57) ABSTRACT

A biomethod using a consortium of *Pseudomonas* sp. to reduce contaminants such as 1,4-dioxane in groundwater.

3 Claims, No Drawings

BIOAUGMENTATION TO REMEDIATE DIOXANE IN GROUNDWATER

This application claims priority from U.S. Application No. 61/119,775 filed Dec. 4, 2008, which is expressly incorporated by reference herein in its entirety.

A method to remediate solvent contamination of groundwater. In one embodiment, the method bioremediates 1,4-dioxane.

1,4-Dioxane (chemical formula $C_4H_8O_2$) is commonly used as an aprotic solvent in chemical manufacturing, and is a common contaminant of the chlorinated solvent trichloroethylene (TCE). As such, it can contaminate groundwater.

The inventive method uses a commercially available consortium of organisms available under the trademark CL-OUT® (Cl Solutions LLC, www.cl-solutions.com) to remediate contaminated groundwater. CL-OUT® is a consortium of *Pseudomonas* sp. organisms, including *Pseudomonas putida* strain B deposited with the Northern Regional Research Laboratory (NRRL) (Microbial Genomics and Bioprocessing Research Unit, National Center for Agricultural Utilization Research, Peoria, Ill.) under accession number NRRL-B-18117, *Pseudomonas putida* stain E (NRRL-B-18118), and *Pseudomonas fluorescens* strain G (NRRL-B-18296), that have been selected for their ability to degrade chlorinated solvents into harmless organic chemicals through aerobic cometabolism. CL-OUT® is prepared under rigorous quality assurance and quality control standards and protocols to ensure it is free of pathogenic microbes. These protocols also assure the reliability and cost-effectiveness of CL-OUT® bioremediation.

In the method, CL-OUT® and dextrose are added to the subsurface of the contaminated or potentially contaminated groundwater to initiate aerobic solvent degradation. Dextrose provides an initial energy source for the CL-OUT® microorganisms, allowing them to multiply. As the CL-OUT® organisms utilize and deplete the dextrose, enzymes are produced that convert the solvents into organic acids. Degradation of chlorinated solvents by aerobic cometabolism produces only the harmless by-products of carbon dioxide and water.

CL-OUT® treatment introduces a sufficiently high population of microorganisms into the treatment zone. Bioremediation is based on the volume of CL-OUT® that is needed to achieve a target microbial population density in the volume of groundwater under the proposed treatment area. While there may be naturally-occurring organisms capable of degrading the contaminants, the benefit of bioaugmentation is that the added population is higher than what the stimulated levels can reach. The added microorganisms are known to effectively degrade the contaminants of concern; overall, bioaugmentation removes the guesswork and reduces the risk of project failure.

Certain conditions may impact the applicability of bioremediation to the site. Ground permeability must be sufficient to achieve effective and uniform distribution of the microorganisms through the aquifer. The levels of dissolved oxygen (DO) must be sufficient to support aerobic cometabolism. The site of the study subsequently described met both conditions.

Options for full-scale treatment rely on assumptions made about the distribution and effectiveness of the CL-OUT® microorganisms in the subsurface. A pilot study was undertaken to verify these assumptions prior to full-scale implementation of the treatment plan. The pilot study determined the potential applicability of the CL-OUT® bioremediation to the site to degrade organic contaminants under site-specific conditions, which also provided site-specific information for effective full-scale treatment. It verified that CL-OUT® bioremediation is capable of degrading the target compounds, including 1,4-dioxane, under site specific conditions. It also evaluated the availability of oxygen and nutrients to support CL-OUT® bioremediation, and determined the potential effectiveness for full-scale treatment.

In one embodiment, the method was performed on ground water that had been extracted from the site. In one embodiment, the method may be performed on ground water in situ, that is, without extracting ground water from the site.

The site evaluated in the pilot study was an area of historically high concentrations of chlorinated solvents. In addition to trichloroethylene (TCE), which was the main contaminant, 1,4-dioxane was also present.

CL-OUT® and dextrose were introduced from two injection points that were from 60 feet to 90 feet below grade. The results of the application were measured by ground water sampling from three down gradient monitoring wells at 10 feet, 30 feet, and 50 feet, respectively from the injection points; two gradient monitoring points at 10 feet and 20 feet, respectively, side gradient and 10 feet down gradient, from the injection points; and one up gradient monitoring point at 10 feet from the injection points.

In one embodiment, bioremediation was performed with a CL-OUT® population of $10^6$ colony forming units per milliliter (CFU/mL). Based on experience at sites with similar conditions, the expected radius of treatment influence of the injection wells was 12 feet. Based on the layout of the area to be remediated in the pilot study, the injected volume of CL-OUT® was expected to diffuse over an area of about 500 square feet. With the treatment depth of 60 feet to 90 feet, this was a volume of 15,000 cubic feet ($ft^3$). With a porosity of 0.35, this volume contained about 39,000 gallons of ground water.

In one embodiment, bioremediation was performed with CL-OUT® delivered as a concentrate in units that contained $10^9$ CFU/mL. While in theory, one unit of CL-OUT® should be sufficient to treat 55,000 gallons of ground water, injection into ground water may not provide perfect mixing. Thus, based on experience at similar sites, one 55-gallon unit of CL-OUT® was applied per 20,000 gallons of ground water to deliver the target population ($10^6$ CFU/mL) uniformly across the treatment area.

For the pilot study, the dosage of CL-OUT® was doubled so that four units were injected into the two injection points. As a result of the doubling, the CL-OUT® population in the subsurface should have reached $2\times10^6$ CFU/mL.

There are three aspects to degradation of target contaminants. First, the total mass of contaminants should be reduced. Second, the total toxicity of the contaminants should be reduced. Third, it should be clear that the contaminant reduction was achieved by degrading the target contaminants, not by dilution or displacement.

The following Tables show raw sampling data for the indicated contaminants in µg/L obtained on the dates indicated over the May 22, 2007 to Jan. 14, 2008 period, as well as calculated reductions, at various sampling locations.

Table 1 shows data trends for the total concentration of volatile organic compounds (VOC) during the pilot study. The total concentration of VOC were considered as the sum of the mass of the main contaminants, including TCE, in micrograms per liter (µg/L).

As shown in Table 1, after treatment as previously described, the total contaminant mass in the up-gradient monitoring well (PT07) decreased by 22%. While not being bound by an theory, this 22% decrease may have been due to the slug injection of the microorganisms that pushed the microorganisms up-gradient. In the nearest down-gradient monitoring point (PT08), the percent reduction was as much as 73%. Farther down-gradient at 30 feet (PT09), the percent reduction in the middle aquifer zone was 79%. At 50 feet down-gradient (PT10), the percent reduction was as much as 43%. The side gradient wells that were 10 feet away from the injections points (PT11) had 64% reduction, and the side gradient wells that were 20 feet away from the injection points (PT12) had 36% reduction. These results demonstrated that there was significant contaminant reduction as much as 30 feet to 50 feet down-gradient, and 10 feet to 20 feet side-gradient from the injection wells.

assumed that the microorganisms traveled 10 feet within two weeks, as subsequently shown in the section on populations. Assuming 35% porosity, the volume of ground water contained in a 10 foot radius of influence around the two injection points (600 square feet) was 39,000 gallons. The injected volume was 220 gallons, or 0.6% of the total ground water volume. Dilution by this volume was insufficient to account for the significant change in contaminant concentrations; thus, the contaminant concentrations were reduced by destruction.

TABLE 1

Total VOC Concentration (μg/L)

| Sampling Location | May 22 | Jul 17 | Aug 7 | Aug 21 | Sept 17 | Oct 17 | Nov 11 | Dec 12 | Jan 14 | Maximum Reduction |
|---|---|---|---|---|---|---|---|---|---|---|
| PT07 | 96.0 | 94.0 | 92.0 | 87.0 | 81.7 | 98.0 | 75.1 | 67.6 | 56.7 | 22% |
| PT08 | 66.6 | 46.3 | 24.3 | 23.5 | 22.3 | 19.9 | 18.0 | 20.0 | 40.4 | 73% |
| PT09 | 113 | 70 | 68.9 | 30.5 | 20.9 | 28.0 | 35.2 | 32.7 | 27.7 | 82% |
| PT10 | 72.7 | 53.3 | 51.9 | 56.5 | 47.8 | 53.0 | 45.0 | 41.3 | 45.3 | 43% |
| PT11 | 33.6 | 55.1 | 54.7 | 44.1 | 34.6 | 46.4 | 55.2 | 39.5 | 49.2 | 64% |
| PT12 | 100 | 105 | 82.3 | 88.0 | 65.0 | 73.3 | 67.9 | 61.1 | 81.2 | 36% |

Table 2 shows data trends for the concentration of 1,4-dioxane during this pilot study. While 1,4-dioxane was found only in relatively low concentrations and at only one location, it was considered a potential risk driver.

As shown in Table 2, sampling results showed that the concentration of 1,4-dioxane was completely eliminated in several of the sampling locations. While there was 60% reduction in the up-gradient well (PT07), the reduction in the 10 feet down-gradient (PT08) was complete to below detection limits. Farther down-gradient at 30 feet (PT09), the reduction was also complete to below detection limits. At 50 feet down-gradient (PT10), the reduction was 64%. These results verified that CL-OUT® bioremediation degraded 1,4-dioxane under site-specific conditions.

It is not clear whether the concentration of 1,4-dioxane was reduced in the side gradient wells. The 1,4-dioxane concentration may have been below detection limits before the pilot study and the concentration fluctuated after treatment. At PT-12, the 1,4-dioxane concentration decreased by as much as 64%, but fluctuated during later sampling.

The natural and background pH at the site was relatively acidic. The geochemistry responsible for this condition is not clear. The water provided for hydration reportedly met drinking water standards, but the pH was not known.

The pH drifted during the treatment and ranged from pH 4 to pH 5.5 (data not shown). The impact of pH on activity of the microorganisms in CL-OUT® was unclear. While the pH may have reduced the viability of the CL-OUT® organisms, it did not prevent the effectiveness of CL-OUT® bioremediation to achieve significant contaminant mass destruction.

The natural levels of dissolved oxygen (DO) and the natural oxidation-reduction potential (ORP) of the aquifer were relatively high. Historical background conditions outside of the pilot study showed levels of DO ranging from 0.74 mg/L to 7.26 mg/L, but at most locations the levels of DO ranged from 2 mg/L to 5 mg/L (data not shown). In the pilot study area, the sampling in May and July showed the aquifer condition was aerobic, but there was some inconsistency between the actual levels. After the injection of CL-OUT®, the DO levels remained high in all of the pilot study wells except the

TABLE 2

1,4-Dioxane Concentration (μg/L)

| Sampling Location | May 22 | Aug. 7 | Aug. 21 | Sept. 17 | Oct. 17 | Nov. 11 | Dec. 12 | Jan. 14 | Maximum Reduction |
|---|---|---|---|---|---|---|---|---|---|
| PT07 | 9.7 | 11 | 7.9 | 21 | 6.6 | 7.0 | 4.1 | 3.2 | 60% |
| PT08 | 6.9 | 0 | 0 | 0.89 | 0 | 0 | 0 | 0 | 100% |
| PT09 | 25 | 6.7 | 0 | 1.8 | 0 | 2.2 | 0 | 0 | 100% |
| PT10 | 5.6 | 2.8 | 3.3 | 8.4 | 3.2 | 2.4 | 2.0 | 2.2 | 64% |
| PT11 | 0 | 3.2 | 0 | 6.2 | 1.9 | 2.0 | 0 | 0 | 100% |
| PT12 | 17 | 12 | 11 | 15 | 4.3 | 7.5 | 3.9 | 7.2 | 64% |

CL-OUT® was injected in a liquid solution dispersed from the injection points through the aquifer. While there is a possibility that adding a liquid may significantly dilute the aquifer water, and that the sampling results will show dilution effects instead of contaminant destruction, the volume of liquid added in the CL-OUT® solution was minimal, so that dilution was not a significant factor.

Four 55-gallon units of CL-OUT® were added to the aquifer over a 30-foot thick zone. It was expected that the microorganisms may travel 15 feet from the injection points. It was up-gradient well (PT07), where the DO started at 0.83 mg/L and decreased to as low as 0.67 mg/L. The DO in PT10 also decreased during the pilot study but not as much as in PT07.

ORP readings, which are generally more stable and accurate than DO readings, were taken only after the CL-OUT® injections. Table 3 summarizes the DO concentrations, and Table 4 shows the ORP readings. The ORP readings confirmed that the aquifer remained aerobic during the CL-OUT® injections in all wells except PT07.

TABLE 3

Dissolved Oxygen (in mg/L) Concentrations

| Sampling Location | Sampling Date | | | | | | | |
|---|---|---|---|---|---|---|---|---|
| | May 22 | July 17 | Aug 6 | Aug 21 | Sep 17 | Oct 17 | Nov 13 | Dec 12 | Jan 14 |
| PT07 | 0.85 | NT | 0.55 | 0.67 | 0.83 | 0.67 | 0.5 | 0.54 | 0.62 |
| PT08 | 0.27 | 1.39 | 2.09 | 2.86 | 3.0 | 3.35 | 3.7 | 3.27 | 2.71 |
| PT09 | 0.28 | 2.12 | 2.24 | 3.12 | 3.4 | 3.41 | 3.55 | 2.93 | 4.6 |
| PT10 | 0.09 | 1.75 | 1.09 | 0.71 | 0.98 | 0.69 | 1.08 | 0.66 | 0.8 |
| PT11 | 2.73 | 2.38 | 2.57 | 2.70 | 3.0 | 2.44 | 2.77 | 3.1 | 2.62 |
| PT12 | 1.77 | 2.42 | 2.61 | 3.04 | 2.6 | 3.39 | 2.54 | 2.05 | 2.23 |

TABLE 4

Oxidation Reduction Potential (in millivolts)

| Sampling Location | Sampling Date | | | | | | | |
|---|---|---|---|---|---|---|---|---|
| | July 17 | Aug 6 | Aug 21 | Sep17 | Oct 17 | Nov 13 | Dec 12 | Jan 14 |
| PT07 | NA | 292 | 11.2 | −19.5 | −82.3 | 69.4 | 53 | −15.8 |
| PT08 | 195 | 209 | 382 | 200 | 1125 | 132 | 251 | 113 |
| PT09 | 205 | 114 | 399 | 202 | 103 | 196 | 340 | 236 |
| PT10 | 163 | 153 | 378 | 199 | 5.1 | 327 | 314 | 283 |
| PT11 | 206 | 201 | 185 | 195 | 205 | 167 | 294 | 231 |
| PT12 | 172 | 119 | 121 | 189 | 52.0 | 198 | 265 | 40.5 |

Nutrients are typically monitored to determine whether microbial growth is limited by nutrient availability. Specifically, other microorganisms rely on nitrate and phosphate for cellular growth. CL-OUT® bioremediation, however, delivers the target population of microorganisms to the subsurface without relying on an increase in available nutrients to achieve the expected results. While CL-OUT® microorganisms may thrive better with high nitrate levels, high phosphate levels are not necessary.

The pilot study demonstrated that CL-OUT® bioremediation achieved degradation of TCE and 1,4-dioxane contaminants under site-specific conditions. Monitoring results verified that the contaminant concentrations were reduced by at least 70% from 10 to 30 feet down-gradient of the injection locations. The impact reduced concentrations as much as 40% from the monitoring point 50 feet down-gradient. The extent of contaminant reduction was equally effective on 1,4-dioxane as well as other contaminants of concern. The contaminant reduction was sufficient for full scale application.

As would be apparent to a person of ordinary skill in the art, various changes and modifications are possible and are contemplated. The embodiments described are only specific embodiments of the inventor who is skill in the art, and are not limiting. Therefore, changes, modifications, and alternations may be made without departing from the scope of the invention.

What is claimed is:

1. A bioaugmentation method to remediate 1,4-dioxane in ground water, the method comprising
   providing a consortium of *Pseudomonas* sp. comprising *Pseudomonas putida* strain B, *Pseudomonas putida* strain E, and *Pseudomonas fluorescens* strain G to groundwater containing 1,4-dioxane, the consortium provided under conditions sufficient to reduce a level of 1,4-dioxane resulting in at least partially bioremediated water.

2. The method of claim 1 wherein the consortium is provided to an existing groundwater reservoir without removing the groundwater from the reservoir.

3. The method of claim 1 wherein the consortium is administered with a carbon source sufficient to promote growth of the *Pseudomonas* populations in the composition.

* * * * *

UNITED STATES PATENT AND TRADEMARK OFFICE
CERTIFICATE OF CORRECTION

| | | |
|---|---|---|
| PATENT NO. | : 8,241,500 B2 | Page 1 of 1 |
| APPLICATION NO. | : 12/623672 | |
| DATED | : August 14, 2012 | |
| INVENTOR(S) | : Saul | |

It is certified that error appears in the above-identified patent and that said Letters Patent is hereby corrected as shown below:

Title Page, Item (73): Assignee "CI Solutions, LLC" should read --CL Solutions, LLC--

Signed and Sealed this
Second Day of October, 2012

David J. Kappos
*Director of the United States Patent and Trademark Office*